United States Patent [19]

Coleman, Jr.

[11] Patent Number: 4,480,274

[45] Date of Patent: Oct. 30, 1984

[54] RECORD VERIFY AND OPTIMIZE SYSTEM

[75] Inventor: Charles H. Coleman, Jr., Redwood City, Calif.

[73] Assignee: Ampex Corporation, Redwood City, Calif.

[21] Appl. No.: 485,159

[22] Filed: Apr. 15, 1983

Related U.S. Application Data

[63] Continuation of Ser. No. 368,800, Apr. 16, 1982.

[51] Int. Cl.³ .................... G11B 27/36; G11B 15/02
[52] U.S. Cl. ............................................ 360/31; 360/18
[58] Field of Search ........................... 360/25, 31, 18

[56] References Cited

U.S. PATENT DOCUMENTS

| | | | |
|---|---|---|---|
| 4,263,625 | 4/1981 | Warren | 360/31 |
| 4,413,288 | 11/1983 | Hurst | 360/81 |

Primary Examiner—Vincent P. Canney
Attorney, Agent, or Firm—Elizabeth E. Strnad; Joel D. Talcott

[57] ABSTRACT

A method and apparatus are disclosed for enabling the continuous monitoring of recording circuit performance and the automatic optimization of the recording process in a rotary head recorder having a plurality of recording heads. A calibration signal is recorded by each recording head onto the overlap area of a moving magnetic tape medium. A fixed monitor head subsequently detects components of the recorded signal, the magnitudes of which are squared and retained in sample and hold units. The sampled and held values are periodically used to construct an outputted value commensurate with recording circuit performance. Optimization is accomplished by varying the recording drive level of a recording head about a predetermined point during a series of successive overlap periods. A DC error voltage is derived from the respective outputs resulting from such variation, and used to shift the recording drive level of that head towards a point of optimum playback output.

51 Claims, 12 Drawing Figures

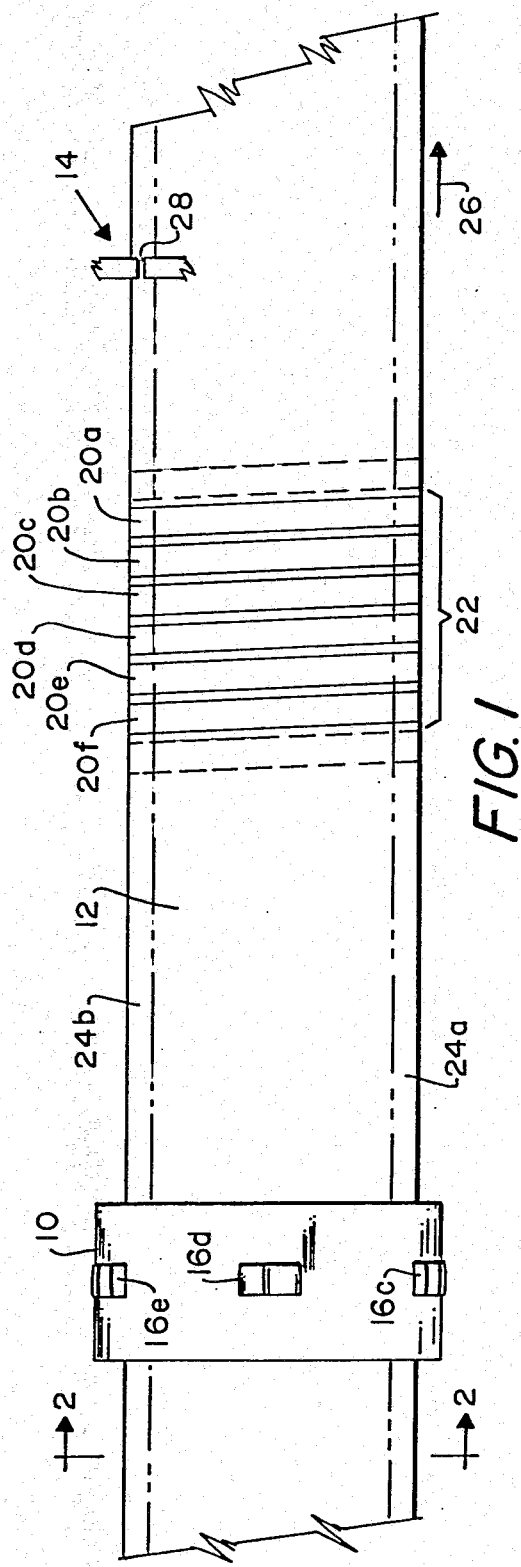
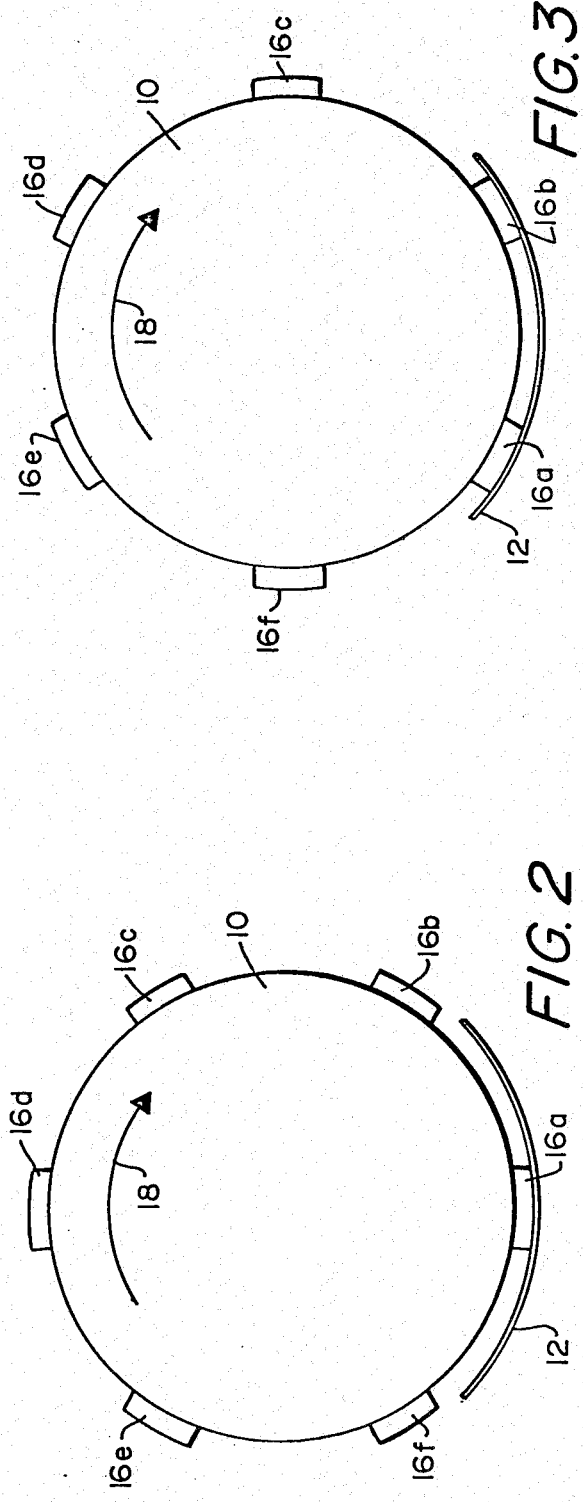

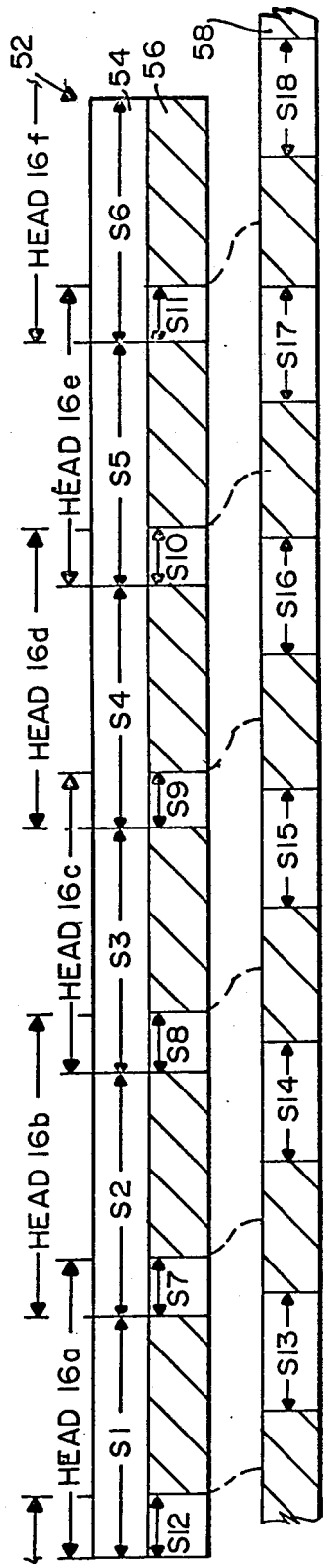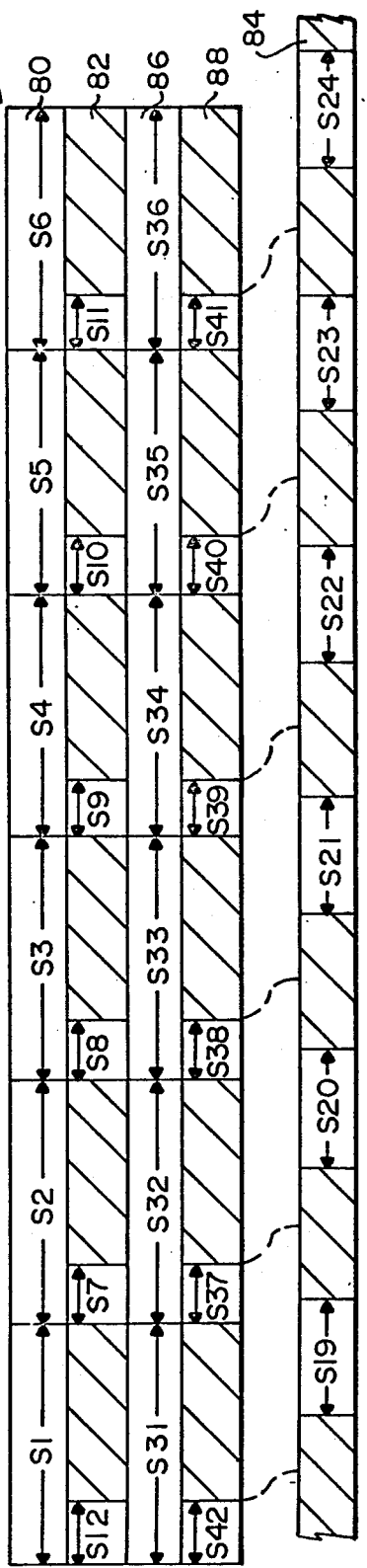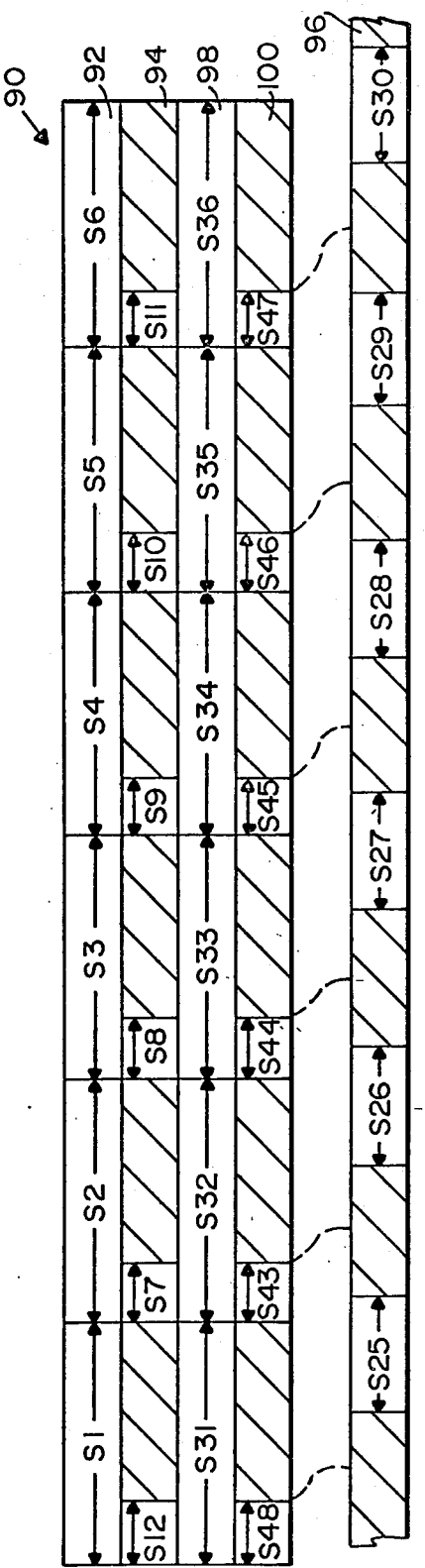
FIG. 5　　FIG. 7-A　　FIG. 7-B

RECORD VERIFY AND OPTIMIZE SYSTEM

The invention described herein was made in the course of Contract F 33657-81-C-1032 awarded by the United States Government.

This is a continuation, of application Ser. No. 368,800, filed Apr. 16, 1982.

The present invention relates to a method and apparatus for verifying and optimizing recording performance and more particularly relates to a method and apparatus for monitoring playback output as a function of recording drive level and continuously and automatically maintaining the recording drive level at a selected playback output in a rotary head recorder having a plurality of record-reproduce heads.

A rotary head recorder is a class of device used particularly in the field of video magnetic recording and in its classic embodiment contains a rotary head asembly on which are mounted a plurality of record-reproduce heads. The rotary head assembly is in a spaced relationship with a magnetic tape medium. As the assembly rotates the record-reproduce heads mounted thereon pass across the magnetic tape medium thereby recording data tracks thereupon.

Some audio recording machines with fixed recording heads have downstream monitoring heads that monitor the recording during playback and in effect reproduce the whole recording. In a rotary head recorder it is much more difficult to follow a particular rotary head with a monitoring system. One method would be to provide a second set of record-reproduce heads mounted in a second rotary head assembly that would in effect reproduce the entire recording. Such a method is too expensive and inefficient to be practical. At present, there exists no prior art for economically and efficiently monitoring recording circuit performance or for providing continuous optimization of the recording process in a rotary head recorder.

Accordingly, it is an object of the present invention to provide a method and apparatus for monitoring recording circuit performance and for optimizing the recording process in a rotary head recorder.

Another object of the present invention is to provide an apparatus for monitoring recording circuit performance in a rotary head recorder having a plurality of recording heads mounted in a rotary head assembly wherein only one fixed reproduce head is required to monitor recording performance of all of the recording heads, thus eliminating the expense and inefficiency of using a second set of reproduce heads mounted in a second rotary head assembly to accomplish such monitoring.

A further object of the present invention is to provide a method for monitoring recording circuit performance in a rotary head recorder wherein such method is not operational while data input to the recorder is being recorded and thus does not interfere or interact with the recordation of such input data.

Yet another object of the present invention is to provide a method and apparatus for continuously and automatically optimizing recording performance in a rotary head recorder having a plurality of recording heads wherein the recording drive level for each recording head is continuously maintained at a point of selected playback output for current head/tape conditions.

Yet a further object of the present invention is to provide a method and apparatus for continuously and automatically optimizing recording circuit performance in a rotary head recorder that utilizes the aforementioned method and apparatus for monitoring recording circuit performance in a rotary head recorder.

These and other objects and advantages of the present invention will become more apparent upon reference to the accompanying drawings and following descriptions in which:

FIG. 1 is a diagramatic illustration showing the relative orientation of a rotary head assembly, a monitor head and a magnetic tape medium in a rotary head recorder;

FIG. 2 is a view taken along line 2—2 of FIG. 1;

FIG. 3 is a view similar to FIG. 2 showing the rotary head assembly in a moved position;

FIG. 5 is a timing diagram associated with the schematic block diagram of FIG. 4;

FIGS. 7a and 7b are timing diagrams associated with the circuit shown in FIG. 6;

Figure 8:
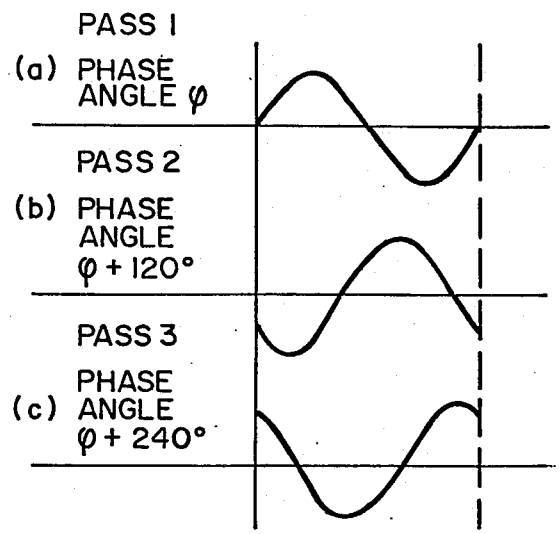
Figure 9:
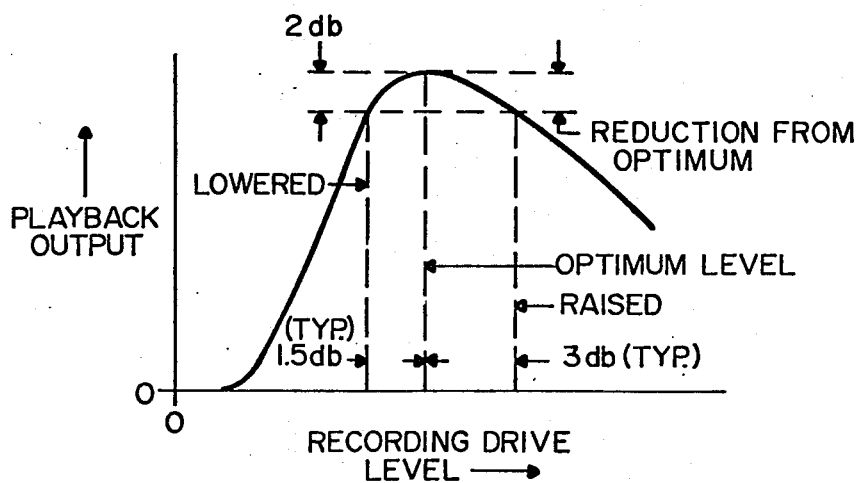

FIGS. 8a–c are waveforms that are useful in describing the operation of portions of the apparatus of the present invention; and FIG. 9 is a typical characteristic curve of playback output versus recording drive level.

Broadly stated, the present invention is directed to a method and apparatus for monitoring recording circuit performance and a method and apparatus for optimizing the recording process in a rotary head recorder having a plurality of recording heads.

The above methods and apparatus take advantage of a portion of a magnetic tape medium commonly referred to as an overlap area. The overlap area of the magnetic tape medium is only recorded upon when two adjacent record-reproduce heads, the first head having recorded a data track upon the moving magnetic tape and the second head about to record such a track, are both in nominal contact with the moving magnetic tape. Normal input data is recorded upon a track of the moving magnetic tape when an individual record-reproduce head sweeps across the tape medium. When a record-reproduce head is positioned above the overlap area, no useful input data is being recorded upon the magnetic tape medium by one of the heads, but is by the other.

The first method of the present invention involves switching off the normal input channel to one of the record-reproduce heads when a record-reproduce head is positioned above the overlap areas of the moving magnetic tape and switching on a calibration signal to that head. The calibration signal is preferably periodic and of constant amplitude and varying phase and is of a wavelength whose value lies within the range of wavelength values of the data signal. The calibration signal is recorded upon the tape medium by each record-reproduce head in turn as it passes across that overlap area. When these recorded signals are subsequently sampled or detected, they are used to reconstruct a signal proportional to the amplitude of the original calibration signal as recorded by that particular record-reproduce head. Such reconstruction will result in a developed signal indicative of recording circuit performance. The developed signal is applied to a monitoring means which allows the developed signal to be utilized in machine or human responsive form. This method accomplishes the continuous and automatic verification of recording circuit performance for each record-reproduce head of a rotary head recorder.

The second method of the present invention utilizes the system hereinabove described. Basically, the recording drive level of a particular recording head is varied according to a predetermined schedule, being effective only during the time such recording head passes across the overlap area of the moving magnetic tape and records the calibration signal thereon. The resulting hereinbefore described developed signals may then be used to locate certain points on the characteristic curve of the recording system that results when playback output is plotted against recording drive level, and more particularly to determine the optimum recording drive level that results in a selected playback output for current head/tape conditions. When the desired recording drive level is determined for a particular record-reproduce head, the record drive level during the active (data) portion of that head pass is made equal to this value. Meanwhile, during the calibrate portion of the head pass, the testing to determine the optimum value continues. This process operates separately and continuously for each individual record-reproduce head and results in the continuous and automatic optimization of the recording drive level for each head.

Referring now to FIGS. 1-3, there is shown a rotary head assembly 10, a magnetic tape medium 12 and a monitor head 14. Rotary head assembly 10 has a plurality of record-reproduce heads 16a-f and rotates in the direction shown by an arrow 18. Magnetic tape medium 12 has a plurality of tracks 20a-f which repeat for each complete rotation of assembly 10 defining a track sequence 22. Each track 20a-f is associated with a different one of heads 16a-f, respectively. A guard band separates each track 20a-f to prevent overlapping and crosstalk. Medium 12 further has a pair of overlap areas 24a and 24b defined when two of heads 16a-f are adjacent medium 12 (FIG. 3), as medium 12 travels in a direction as shown by an arrow 26. As hereinbelow described, monitor head 14 has a gap 28 oriented perpendicularly to tracks 20a-f rather than perpendicular to longitudinal tape motion, which is conventional for a fixed head.

Each of heads 16a-f record in or reproduce from one of tracks 20a-f associated therewith. Although the example shown in FIGS. 1-3 illustrates a transverse rotary head assembly 10, the principles of the present invention are applicable to any rotary head recorder wherein the head need not be oriented transversely to medium 12 which would define a plurality of helical tracks on tape medium 12. Of course, if helical tracks are produced the orientation of monitor head 14 is likewise modified.

Figure 4:
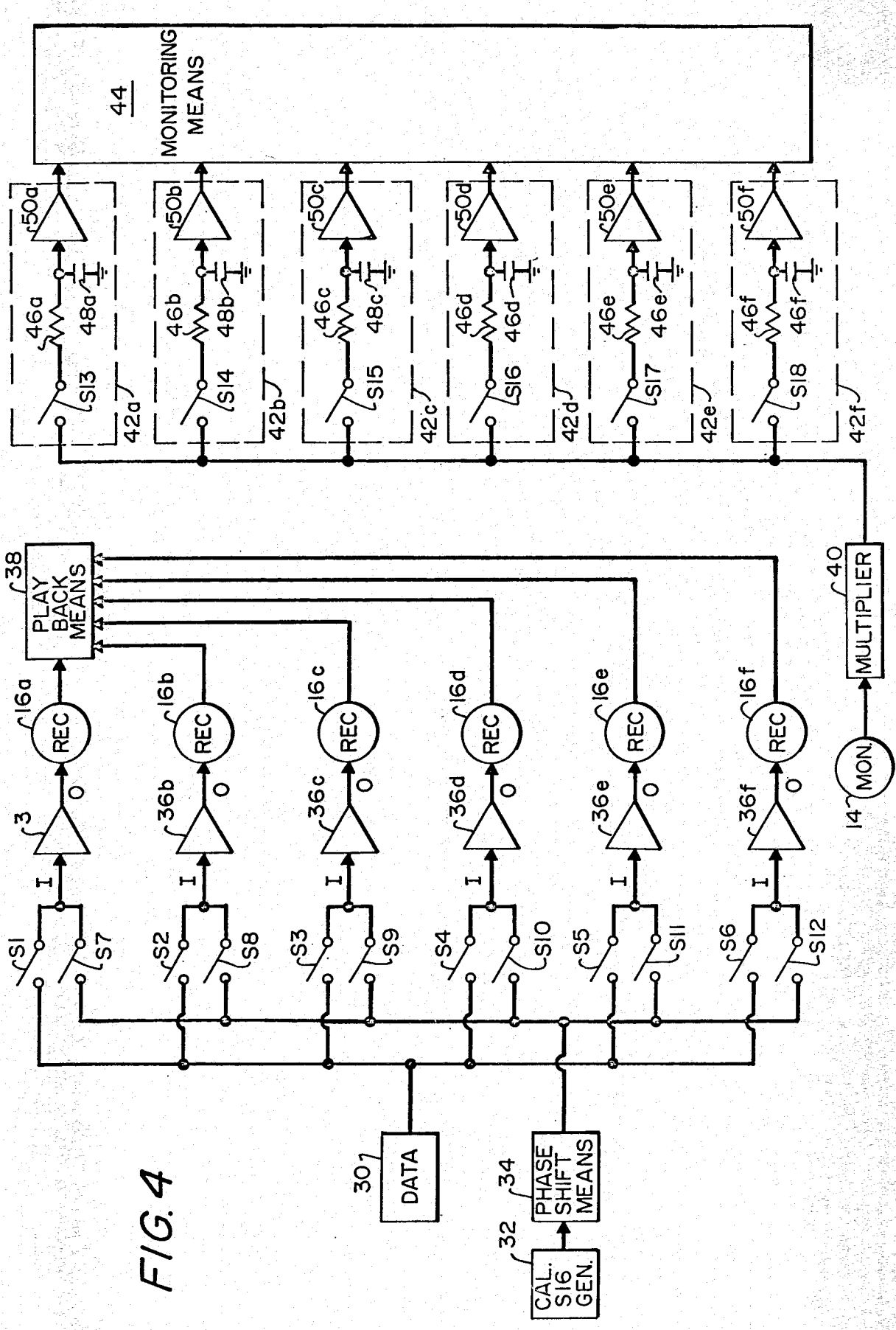
FIG. 4 is a schematic block diagram of one embodiment of the present invention for monitoring recording circuit performance in a rotary head recorder.

Referring now to FIG. 4 there is shown a data source 30, a calibration signal generator 32, a phase shift means 34, a first set of switches S1-6, a second set of switches S7-12, a plurality of record drive amplifiers 36a-f, playback means 38, a multiplier 40, a plurality of sample and hold circuits 42a-f and a monitoring means 44. Each of sample and hold circuits 42a-f has a switch S13-18, a resistor 46a-f, a capacitor 48a-f and a buffer amplifier 50a-f, respectively.

Each one of amplifiers 36a-f and each one of sample and hold circuits 42a-f are associated with a different one of record-reproduce heads 16a-f. Data source 30 applies electrical data to each one of switches S1-6. Switches S1-6 are sequentially closed to apply such electrical data to amplifiers 36a-f upon each one of record-reproduce heads 16a-f transversing medium 12 (FIGS. 1-3). Calibration signal generator 32 develops a calibration signal of constant amplitude and frequency and applies such signal to phase shift means 34. As hereinafter described, phase shift means 34 periodically changes the phase of the calibration signal. The phase shifted calibration signal from phase shift means 34 is applied to each one of second set of switches S7-12. Each of second set of switches S7-12 switch the calibration signal to a different one of amplifiers 36a-f upon the associated one of record-reproduce head 16a-f passing over overlap area 24a. Thus as each one of record-reproduce heads 16a-f transverses medium 12, it either writes data into or reads data from its respective one of tracks 20a-f in-between overlap areas 24a and b. Immediately after writing data, each one of record-reproduce heads records the calibration signal into overlap area 24b within its respective one of tracks 20a-f. When reading data from tracks 20a-f, each record-reproduce head 16a-f develops an electrical signal for application to playback means 38. The writing and reading operations of record-reproduce heads 16a-f are determined by a conventional control circuit (not shown) which selectively activates one of data source 30 and playback means 38.

Monitor head 14, being positioned adjacent overlap area 24b develops an electrical signal determined from the calibration signal as recorded in such overlap area 24b. This electrical signal is applied to multiplier 40 which converts the electrical signal to a second electrical signal determined from the unidirectional scalar magnitude of the first signal. The second signal is applied to each one of sample and hold circuits 42a-f. The third set of switches S13-18 of each sample and hold circuit 42a-f closes when monitor head 14 passes over one of tracks 20a-f defined by an associated one of record-reproduce heads 16a-f. The RC time constants defined by each resistor 46a-f and each capacitor 48a-f is chosen to provide an averaging function of the second signal switched into each of sample and hold circuits 42a-f. The averaged signal stored on each capacitor 48a-f, is applied to monitoring means 44 through each buffer amplifier 50a-f. Monitoring means 44 utilizes the average signal in human or machine responsive form.

With further reference now to FIG. 5, the operation of the circuit described in conjunction with FIG. 4 will be more fully described.

FIG. 5 illustrates a timing diagram 52. The sequence of operation of the first set of switches S1-6 is shown on line 54, the sequence of operation of the second set of switches S7-12 is shown on the second line 56 and the sequence of operation of the third set of switches S13-17 is shown on the third line 58. Line 54 indicates that each of switches S1-6 is sequentially closed once during each complete rotation of rotary head assembly 10 so that data from data source 30 is continuously applied to one of record-reproduce heads 16a-f. Line 56 indicates that immediately after each one of record-reproduce heads 16a-f has recorded data, such record-reproduce head will record a portion of the calibration signal in overlap area 24b by closing the appropriate one of second set of switches S7-12. The cross hatched areas of line 56 indicate that during such times all of second set of switches S7-12 are open. Third line 58 indicates that third set of switches S13-18 are momentarily closed in sequence to reproduce the portions of the calibration signal recorded in overlap area 24b from the respective one of tracks 20a-f. Line 58 further shows that an unknown time delay exists, due to tape travel time between rotary head and monitor head, such as when track 20a is recorded upon closing of switch S1 and its overlap area by closing of switch S7 and its subsequent reproducing when switch S13 is closed.

With the time delay between the recording of a calibration signal on a specific track and its subsequent detection by monitor head 14 being unknown, conventional means are necessary for identifying which signal corresponds to which track. One possible method would be to periodically record no calibration signal in one or more selected tracks and begin recording the signal on a next track with a predetermined recording head. When this lack of signal is detected the timing means associated with the operation of the monitoring circuit according to the present invention, it will know the identity of the recording head providing this next track signal. In addition, a conventional phase lock loop or similar circuit may be provided to detect signal transitions in the monitor head 14 output, corresponding to transitions between adjacent tracks, to provide a means for determining when the monitoring head 14 is over the center of a specific track.

The calibration signal in one embodiment of the present invention has a frequency which is an integer multiple of the rate of rotation of rotating head assembly 10. After each complete rotation of that assembly 10, phase shift means 34 shifts the phase of the calibration signal a selected amount after each track sequence 22 has been recorded. In this regard phase shift means 34 may provide in one embodiment of the present invention three paths for the calibration signal. The first path not changing the phase of the calibration signal, a second path changing the phase of the calibration signal 120° and a third path changing the phase of the calibration signal by 240° (FIG. 8). The change of phase may be accomplished by time and phase shift amplifiers. The switching between paths may be referenced in time to the closing of switch S7, for example, to change the phase of the calibration signal once every complete revolution of rotary head assembly 10. Any equally spaced phase shift is possible as long as there are more than two phase shifts per cycle at the calibration signal frequency.

Monitor head 14 develops a series of bi-polar voltage levels commensurate with the instantaneous amplitude of the calibration signal stored in the overlap area 24b of each track 20a-f. This series of voltage levels is applied to multiplier 40 which multiplies each voltage level by itself to develop a series of squared voltage levels which are now unidirectional. By arranging gap 28 of monitor head 14 perpendicular to the recorded tracks 20a-f and in particular, precisely parallel to the gaps of record-reproduce heads 16a-f, assures that a valid sample of the recorded track will be obtained. In accordance with the timing diagram of FIG. 5 and more particularly line 58 thereof, the squared voltage levels are applied to sample and hold circuits 42a-f so that a portion of the squared voltage that existed when one of tracks 20a-f recorded by an associated one of record-reproduce heads 16a-f was passing under monitor head 14. The effective time constant of the RC network formed by resistors 46a-f and capacitors 48a-f is chosen such that the DC voltage stored across each capacitor 48a-f is a smoothed average of the individual measurements of the calibration signal as recorded by a record-reproduce head 16a-f in the associated track 20a-f thereof.

Each buffer amplifer 50a-f develops at its output a signal that is proportional to the average power of the calibration signal recorded by one of record-reproduce heads 16a-f associated with each sample and hold circuit 42a-f. The average signals are proportional to power since the recorded voltage levels are squared by multiplier 40.

The average signal developed by each buffer amplifier 50a-f may be applied to monitoring means 44, which may be any type of monitor that displays the average signal in human or machine responsive form. As hereinbelow described, the average signal, being a function of recorded level (in this case proportional to power level), is useful for determining the optimimum gain or drive level of amplifiers 36a-f.

Simultaneous optimization and verification of the recording processor each of record-reproduce head 16a-f is accomplished as described hereinbelow.

Figure 6:
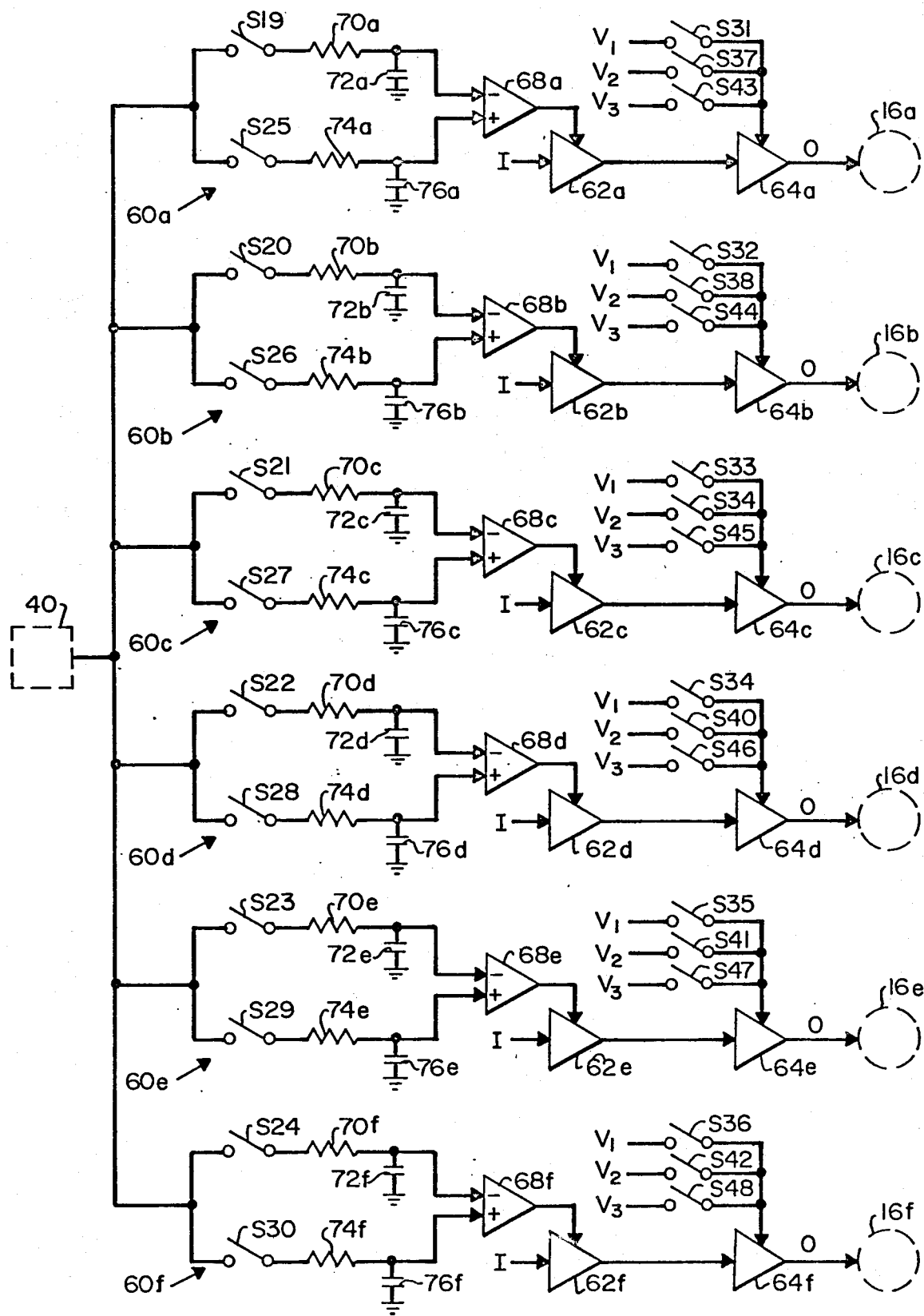
FIG. 6 illustrates a modification to the schematic block diagram shown in FIG. 4 for providing automatic and continuous optimization of the recording circuit in a rotary head recorder.

Referring now to FIG. 6, there is shown a modification to the circuit of FIG. 4, the modification being more particularly directed to the replacement of amplifiers 36a-f and sample and hold circuits 42a-f with the associated networks shown in FIG. 6.

More particularly, FIG. 6 shows a plurality of sample and hold circuit pairs 60a-f, a plurality of first variable gain amplifiers 62a-f, a plurality of second variable gain amplifers 64a-f and a plurality of differential amplifiers 68a-f. An input I is taken from first set of switches S1-6 and second set of switches S7-12 (FIG. 4) and an output O is coupled to record-reproduce heads 16a-f. There is further provided a feedback path from multiplier 40 to each sample and hold circuit pair 60a-f. Each sample/hold circuit pair 60a-f has a first electrical path coupled to the inverting input of each differential amplifier 68a-f and a second circuit path coupled to the non-inverting input of differential amplifier 68a-f. The first path of each sample/hold circuit pair 60a-f has a switch S19-24, a resistor 70a-f and a capacitor 72a-f, respectively. The second path has a switch S25-30, a resistor 74a-f and a capacitor 76a-f, respectively. The output of each differential amplifier 68a-f is coupled to a variable gain input of each of first variable gain amplifiers 62a-f, respectively. A variable gain input of each of second variable gain amplifier 64a-f is coupled to a first voltage source V1 through a plurality of switches S31-36, respectively, a second voltage source V2 through switches S37-42, respectively, and to a voltage source V3 through switches S43-48, respectively. Voltage source V1 when coupled to the variable gain input of variable gain amplifier 64a-f provides a zero db gain in such amplifiers. Voltage source V2 when coupled to the variable gain input of amplifier 64a-f provides, as an example, a negative 1.5 db gain in such amplifiers. Voltage V3 when coupled to the variable gain input of amplifier 64a-f, to continue the example, provides a 3 db gain in such amplifiers. These gains for this example are selected from the representative characteristic curve of playback output versus recording drive level as shown in FIG. 9 which when the recording drive level is lowered and raised in accordance with V2 and V3 the playback output is reduced 2 db from optimum. As hereinafter described, the optimum level is the maximum for playback output of the calibration signal as recorded in the overlap area and may not necessarily be the optimum playback output for electrical data developed by data source 30. The corresponding point on the characteristic curve of FIG. 9 for the optimum level of playback output for electrical data may be determined.

The characteristic curve of FIG. 9 is a curve of record current versus playback voltage. The curve of record current versus playback power, which is in fact what is being monitored by monitoring means 44 since multiplier 40 provides a square of voltage, has a generally similar shape.

Referring now also to FIG. 7a it is seen when each of switches S1-S6 are sequentially closed, switches S31-S36 are also sequentially closed, respectively, as shown on lines 80 and 86. Thus data from data source 30 is always applied to record-reproduce head 16a-f with zero db gain through the respective one of amplifier 64a-f. However when each of heads 16a-16f pass over overlap area 24b to record the calibration signal, switches S37-S42 close simultaneously with the respective one of switches S7-S12, as seen on lines 82 and 88, to record the calibration signal at a lower level, the lower level being lowered by 1.5 db as shown in FIG. 9. Upon the recorded tracks passing monitor head 14, switches S19-S24 close to store the average voltage on the respective one of capacitor 72a-f of a respective one of sample and hold circuits 60a-f. At least three passes, but preferably more, of each one of record-reproduce head 16a-f are necessary across overlap area 24b to provide an average of power at the lowered recording drive level. Line 84 indicates an unknown time delay exists as described above.

Similarly, as seen in FIG. 7b, the calibration signal is recorded at a higher drive level upon switches S43-S48 closing simultaneously with switches S7-S12 as shown at lines 94 and 100. Again switches S31-S36 close simultaneously in sequence with the respective one of switches S1-S6, as seen at lines 92 and 98, to provide zero db gain in amplifier 64a-f when recording data. Switches S25-S30 are closed to store the average voltages on capacitor 76a-f at the higher drive level, line 96 indicating the hereinabove described time delay.

If any of the recording drive levels provided by the series combination of amplifiers 62a-f and 64a-f is at a point other than the optimum as shown in FIG. 9, the inputs of the respective one of differential amplifiers 68a-f will be unbalanced and develop a voltage proportional to such unbalance and apply to the variable gain input of the respective one of variable gain amplifiers 62a-f.

Repeating of recording the calibration signal at lowered and higher recording drive levels will eventually provide a balanced recording drive level and a zero output at each of differential amplifier 68a-f.

Thus it is seen that the novel method and apparatus is provided for monitoring the performance of each recording circuit in a rotary head recorder having a plurality of recording heads. Furthermore a novel method and apparatus is provided for optimizing such recording circuit performance or, alternatively, stabilizing such recording circuit performance about a selected level.

It is of course understood that although a preferred embodiment of the present invention has been illustrated and described, various modifications, alternatives and equivalents thereof will become apparent to those skilled in the art and, accordingly, the scope of the present invention should be defined only be the appended claims and equivalents thereof.

What is claimed is:

1. A method for enabling the monitoring of recording circuit performance in a rotary head recorder having a plurality of recording heads, comprising the steps of: (a) developing a periodic calibration signal of varying phase; (b) applying said calibration signal to one of said recording heads when said recording head is positioned above an overlap area of a moving tape medium so as to cause said calibration signal to be recorded upon said overlap area; (c) subsequently detecting a component of said calibration signal recorded on said tape medium; (d) converting said component to a function of its unidirectional scalar magnitude; (e) sampling and holding the value of said function; (f) repeating steps (a)-(f) for a predetermined period of time; (g) constructing a value proportional to the amplitude of said recorded calibration signal from said sampled and held values; and (h) outputting a signal comensurate with said proportional value.

2. The method of claim 1 wherein said method is applied to each one of said recording heads.

3. The method of claim 1 wherein when one of said recording heads is positioned above said overlap area, the phase of said calibration signal is shifted by 120 degrees with respect to the phase of said calibration signal as of the previous time said recording head was so positioned.

4. The method of claim 1 wherein said function of said nondirectional scalar magnitude consists of said magnitude taken to a natural power.

5. The method of claim 1 wherein said sampled and held values are averaged, the resulting average value being proportional to a function of the amplitude of said recorded calibration signal.

6. A method for enabling optimization of a recording drive process in a rotary head recorder having a plurality of recording heads comprising the steps of: (a) developing a periodic calibration signal of varying phase; (b) applying said calibration signal to one of said recording heads when said recording head is positioned above an overlap area of a moving tape medium so as to cause said calibration signal to be recorded upon said overlap area; (c) subsequently detecting a component of said recorded calibration signal from off of said tape medium; (d) converting said component to a function of its nondirectional scalar magnitude; (e) sampling and holding the value of said function; (f) repeating steps (a)-(f) for a predetermined period of time; (g) constructing a value proportional to the amplitude of said recorded calibration signal from said sampled and held values; (h) outputting a signal commensurate with said proportional value; (i) varying the recording drive level on one of said recording heads when said recording head is positioned over said overlap area; (j) detecting the difference between the values of said outputted signals resulting from said variations in recording drive level; (k) deriving an error measurement from said detected difference; and (l) using said error measurement to control the gain of an amplifier driving said recording head.

7. The method of claim 6 wheren said method is applied to each one of said recording heads.

8. The method of claim 6 wherein said recording drive level is varied about a predetermined point for a predetermined period of time.

9. The method of claim 6 wherein said error measurement is derived by comparing said detected difference with a predetermined expected difference in the values of said outputted signals.

10. The method of claim 5 wherein the gain of said amplifier is changed so that the recording drive level of said recording head is shifted to a point where said error measurement should be reduced to zero.

11. In a rotary head recorder having a rotatable head assembly, a plurality of recording heads mounted radially on said assembly and a moving tape medium, each rotation of said assembly defining a cycle, each of said recording heads sequentially transversing said tape medium one during each cycle defining a plurality of tracks on said tape medium, each of said tracks being associated with a different one of said recording heads and said tracks being repeated for each cycle, said tape medium further having an overlap area transversing said tracks, an apparatus for monitoring recording performance comprising: means for developing a periodic calibration signal of varying phase; means for applying said calibration signal to one of said recording heads when said one of said recording heads is operatively adjacent said overlap area during a selected number of cycles whereby said one of said recording heads records an instaneous component of said calibration signal in said overlap area in each of said tracks associated therewith during said selected number of cycles; a plurality of sample and hold circuits, each of said circuits associated with a different one of said tracks; monitoring means for developing an electrical signal determined from a unidirectional scalar magnitude of the recorded components of said calibration signal in said one of said tracks, said electrical signal being applied to one of said circuits associated with said one of said tracks, said one of said circuits developing an output signal commensurate with the amplitude of the recorded calibration signal.

12. An apparatus in accordance with claim 11 wherein each of said recording heads records an instantaneous component of said calibration signal in each of said tracks associated therewith, said electrical signal being determined from all of said tracks and sequentially applied to each of said circuits upon monitoring each of said tracks associated therewith.

13. An apparatus in accordance with claim 11 wherein said calibration signal is shifted by a selected phase angle indivisible by 180 degrees each cycle.

14. An apparatus in accordance with claim 11 wherein said selected phase angle is 120 degrees.

15. An apparatus in accordance with claim 11 wherein said electrical signal is determined from an integral power of the amplitude of the recorded components.

16. An apparatus in accordance with claim 15 wherein said integral power is a square power.

17. An apparatus in accordance with claim 11 wherein said output signal of each of said output means is an average of said electrical signal applied to each of said circuits associated therewith.

18. An apparatus in accordance with claim 17 wherein said electrical signal is determined from an amplitude of the recorded components taken to a power of two.

19. An apparatus in accordance with claim 18 wherein said average is proportional to the electrical power of the components of said calibration signal recorded in each of said tracks.

20. In a rotary head recorder having a rotatable head assembly, a plurality of recording heads mounted radially on said assembly and a moving tape medium, each rotation of said assembly defining a cycle, each of said recording heads sequentially transversing said tape medium once during each cycle defining a plurality of tracks on said tape medium, each of said tracks being associated with a gap of a different one of said recording heads and said tracks being repeated for each cycle, said tape medium further having an overlap area transversing said tracks, an apparatus for monitoring recording performance comprising: means for developing a periodic calibration signal of varying phase; means for applying said calibration signal to one of said recording heads when said one of said recording heads is operatively adjacent said overlap area during a selected number of cycles whereby said one of said recording heads records an instaneous component of said calibration signal in said overlap area in each of said tracks associated therewith during said selected number of cycles; and a fixed monitor head having a gap and being operatively adjacent said overlap area, said gap being oriented parallel to the gap of each said recording head to develop an electrical signal determined from a sample of said instantaneous component recorded in said overlap area.

21. A method of verifying recording operation in a rotating head magnetic tape recording device, wherein an information signal is recorded along transverse tracks extending substantially in perpendicular with respect to the longitudinal motion of a magnetic tape, comprising the steps of:
applying a selected calibration signal to a rotating head and recording said signal thereby on a designated portion of said transverse tracks;
arranging a stationary head means downstream of said rotating head and adjacent said designated portion of said transverse tracks and orienting a transducing gap thereof substantially in parallel with respect to said longitudinal tape motion to reproduce samples of said calibration signal; and
providing from said samples an output signal which is indicative of a recorded calibration signal level.

22. The method of claim 21 further comprising a step of providing an output signal proportional to the amplitude of said detected signal, which step comprises squaring and averaging said signal detected by said stationary head.

23. The method of claim 21 wherein said device has a plurality of spaced rotating heads and wherein said calibration signal is recorded by said heads in an overlap area of respective recording tracks provided on said magnetic medium.

24. The method of claim 21 wherein the step of applying said calibration signal comprises disconnecting an information signal applied to said rotating head and connecting said calibration signal to said rotating head when it is adjacent said designated portion of said medium.

25. The method of claim 21 wherein said calibration signal is a periodic signal having a known amplitude and frequency.

26. The method of claim 25 wherein said calibration signal has a predetermined constant amplitude and frequency.

27. The method of claim 25 wherein said calibration signal has a wavelength in the order of that of the information signal.

28. The method of claim 27 wherein said output signal is proportional to an average power value of said signal samples.

29. The method of claim 28 further comprising the step of monitoring said output signal.

30. The method of claim 25 further comprising the step of periodically phase shifting said calibration signal by a selected phase angle indivisible by 180 degrees prior to applying it to said rotating head.

31. The method of claim 30 wherein said selected phase angle is an integer number ratio of 360 degrees.

32. The method of claim 25, further comprising the steps of:
   alternatively decreasing and increasing said known amplitude value of said calibration signal by predetermined values periodically during succeeding passes of said rotating head over said medium, prior to applying said calibration signal to said rotating head;
   storing respective output signal values proportional to respective amplitudes of said detected signal recorded at said decreased and increased amplitude values, respectively;
   comparing said stored values to obtain an error signal; and
   controlling by said error signal the amplitude of an information signal to be recorded by said rotating head to obtain an optimum recording signal amplitude.

33. A method of optimizing recording operation of a rotary head magnetic recording/reproducing device, comprising the steps of:
   providing a calibration signal to be recorded by a rotating head of said device on a predetermined portion of an associated recording medium;
   selecting a recording signal level of said calibration signal;
   varying periodically said level of said calibration signal by predetermined values alternatively below and above said selected level respectively, and recording said calibration signal on said predetermined portion of said medium;
   reproducing and storing a signal proportional to playback voltage levels of said calibration signal recorded at said respective signal levels;
   comparing said respective stored signals to obtain an error signal; and
   controlling by said error signal a recording level of an information signal to be recorded by said rotating head to obtain an optimum signal level thereof.

34. A method of optimizing recording operation in a rotating head magnetic recording/reproducing device, comprising the steps of:
   alternatively increasing and decreasing periodically a recording drive level of a selected calibration signal by respective predetermined values to obtain substantially equally reduced values of a playback voltage from an optimum value thereof;
   phase shifting said calibration signal by a predetermined phase angle during consecutive passes of a rotating head over an associated recording medium;
   applying said phase-shifted calibration signal of said decreased and increased amplitude during recording operation to a rotating magnetic head when positioned adjacent to a designated portion of an associated magnetic medium which portion in unused for recording a useful information signal and recording said calibration signal on said designated portion;
   arranging a fixed reproduce head downstream from said rotating head and adjacent said designated portion of said magnetic medium;
   detecting said calibration signal by said fixed head during said recording operation;
   comparing respective detected signal values corresponding to said calibration signal recorded at said alternatively increased and decreased recording drive levels, and providing an error signal proportional to a difference between said respective values; and
   applying said error signal to control a recording drive level of both said calibration signal and information signal to be recorded by said rotating magnetic head to obtain a zero error signal corresponding to an optimum recording drive level.

35. An apparatus for verifying recording operation in a rotating head magnetic tape recording device wherein an information signal is recorded along transverse tracks extending substantially in perpendicular with respect to the longitudinal motion of a magnetic tape, comprising:
   a means for providing a selected calibration signal;
   a means for applying said calibration signal to a rotating head for recording said signal on a designated portion of said transverse tracks; and
   a stationary head means located downstream of said rotating head and adjacent said designated portion of said transverse tracks, said stationary head means having a transducing gap oriented substantially in parallel with respect to said longitudinal tape motion to reproduce samples of said calibration signal; and
   a means for providing from said reproduced sample values an output signal which is indicative of a recorded calibration signal level.

36. The apparatus of claim 35 wherein said output signal is proportional to an average power of said signal samples.

37. The apparatus of claim 35 having a plurality of rotating magnetic heads attached to a rotating drum and wherein each rotating head is coupled to record said calibration signal in an overlap area of said magnetic medium.

38. The apparatus of claim 37 wherein said calibration signal has a frequency equal to an integer multiple of the frequency of rotation of the rotating drum.

39. The apparatus of claim 35 further comprising a means for disconnecting an information signal to be recorded on said medium from said rotating head and for connecting said calibration signal to said rotating head when said head is positioned adjacent said overlap area.

40. The apparatus of claim 35 wherein said calibration signal is a periodic signal having a known amplitude and frequency.

41. The apparatus of claim 4 wherein said calibration signal has a predetermined constant amplitude and frequency.

42. The apparatus of claim 35 further comprising means coupled to receive said reproduced signal from said stationary head and to provide a signal proportional to a unidirectional average value thereof.

43. The apparatus of claim 42 wherein said means coupled to receive said reproduced calibration signal comprises a signal squaring means and signal averaging means coupled to an output of said signal squaring means.

44. The apparatus of claim 42 further comprising means coupled to monitor said signal proportional to said unidirectional average value of said detected signal.

45. The apparatus of claim 38 wherein said means for applying said calibration signal comprises means for periodically phase shifting said calibration signal at selected intervals by a selected phase angle indivisible by 180 degrees prior to applying it to said rotating heads.

46. The apparatus of claim 45 wherein said selected phase angle is an integer number ratio of 360 degrees.

47. The apparatus of claim 40, further comprising:
signal varying means coupled to said means for providing said selected calibration signal for alternatively decreasing and increasing an amplitude thereof by predetermined values periodically during succeeding passes of said rotating head over said medium;
means for storing respective output signals proportional to respective amplitudes of said detected signal recorded at said decreased and increased amplitude values, respectively;
means for comparing said respective stored output signals and for responsively providing an error signal; and
means for applying said error signal to control an amplitude of an information signal to be recorded by said rotating head to obtain an optimum recording signal amplitude.

48. The apparatus of claim 47 wherein said means for storing are sample and hold circuits, respectively.

49. A system for verifying recording operation in a transverse scan rotating head magnetic tape recorder, comprising:
a means for providing a selected calibration signal;
a means for disconnecting an information signal to be recorded and for applying said calibration signal to respective rotating heads of said recorder when each said head is positioned over an overlap portion of an associated magnetic tape;
a stationary head means located downstream of said rotating heads and adjacent said overlap portion of said tape, said stationary head having a transducing gap oriented substantially in parallel with a longitudinal direction of movement of said magnetic tape for reproducing samples of said recorded calibration signal; and
a means coupled to receive said reproduced samples and to provide an output signal proportional to an amplitude of said reproduced samples.

50. The system of claim 47 further comprising means for phase shifting said calibration signal and for applying said phase shifted calibration signal to said rotating heads by a predetermined phase angle at consecutive passes of said rotating heads over said tape.

51. A system for optimizing recording operation in a transverse scan rotating head magnetic recorder, comprising:
a first means coupled to provide a periodic calibration signal of a known amplitude and frequency;
a second means coupled to phase shift said calibration signal by a predetermined phase angle during consecutive passes of the respective rotating heads over said recording medium;
a third means coupled to alternatively decrease and increase said known amplitude of said calibration signal by predetermined values periodically during succeeding passes of said rotating heads over said medium;
a fourth means coupled to apply said phase-shifted calibration signal having said alternatively decreased and increased amplitude in succession to respective rotating heads, for recording in an overlap area of said magnetic medium, respectively;
a stationary head means located downstream of said rotating heads and adjacent said overlap area, said stationary head having a transducing gap oriented substantially in parallel with the gaps of said rotating heads for reproducing samples of said recorded calibration signal;
a fifth means coupled to receive said reproduced samples and to provide an output signal proportional to an amplitude of said reproduced samples;
a sixth means coupled to store said output signal of said fifth means;
a seventh means coupled to compare said respective stored output signals and to responsively provide an error signal; and
an eighth means coupled to apply said error signal to control an amplitude of an information signal to be recorded by said rotating heads to obtain an optimum recorded signal amplitude.

* * * * *

UNITED STATES PATENT AND TRADEMARK OFFICE
CERTIFICATE OF CORRECTION

PATENT NO. : 4,480,274
DATED : October 30, 1984
INVENTOR(S) : Charles H. Coleman, Jr.

It is certified that error appears in the above-identified patent and that said Letters Patent are hereby corrected as shown below:

Column 12, line 57, "claim 4" should read --claim 40--.

Signed and Sealed this

Twenty-third Day of July 1985

[SEAL]

Attest:

DONALD J. QUIGG

Attesting Officer       Acting Commissioner of Patents and Trademarks